(12) United States Patent
Lessing et al.

(10) Patent No.: US 7,701,469 B2
(45) Date of Patent: Apr. 20, 2010

(54) EXTENSION OF DISPLAY LIFETIME

(75) Inventors: Simon Lessing, Malmö (SE); Staffan Lincoln, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 414 days.

(21) Appl. No.: 11/681,626

(22) Filed: Mar. 2, 2007

(65) Prior Publication Data
US 2008/0204362 A1 Aug. 28, 2008

Related U.S. Application Data

(60) Provisional application No. 60/891,355, filed on Feb. 23, 2007.

(51) Int. Cl.
*G09G 5/00* (2006.01)
*G09G 5/10* (2006.01)

(52) U.S. Cl. .................................. 345/619; 345/690

(58) Field of Classification Search ............... 345/619, 345/211, 214, 690
See application file for complete search history.

(56) References Cited

U.S. PATENT DOCUMENTS

| 5,777,619 A | 7/1998 | Brinsmead |
| 6,014,151 A | 1/2000 | Cohen et al. |
| 2003/0071769 A1 | 4/2003 | Sullivan et al. |
| 2004/0051705 A1 | 3/2004 | Lee |
| 2005/0237319 A1* | 10/2005 | Ranganathan et al. ....... 345/214 |
| 2007/0066395 A1* | 3/2007 | Harris et al. ................... 463/39 |

FOREIGN PATENT DOCUMENTS

| EP | 1 489 589 A1 | 12/2004 |
| EP | 1 814 098 A1 | 8/2007 |
| WO | WO 2005/116974 A1 | 12/2005 |

OTHER PUBLICATIONS

Reeves, W. "Particle Systems—A Technique for Modeling a Class of Fuzzy Objects", p. 1-17, Apr. 1983.*
Martin, A., "Particle Systems".*
Invitation to Pay Additional Fees with annexed Partial International Search Report in corresponding PCT application, PCT/EP2007/058393, dated Nov. 15, 2007, 10 pages.
"Particle Systems—A Technique for Modeling a Class of Fuzzy Objects," William T. Reeves, XP-002427042, ACM Transactions on Graphics, vol. 2, No. 2, Apr. 1983, pp. 91-108.

* cited by examiner

*Primary Examiner*—Kee M Tung
*Assistant Examiner*—Jacinta Crawford
(74) *Attorney, Agent, or Firm*—Harrity & Harrity, LLP (57) ABSTRACT

A method is provided for reducing or eliminating degradation effects in a display 22, 22' of a portable device 10 and a portable device for performing such a method. The method comprises the steps of presenting particles 410 of a particle system 400 on the display 22, 22' and moving the particles 410 in the particle system 400 so that the display 22, 22' is substantially uniformly utilized.

22 Claims, 5 Drawing Sheets

EXTENSION OF DISPLAY LIFETIME

RELATED APPLICATIONS

This application claims priority under 35 U.S.C. §119 based on U.S. Provisional Application Ser. No. 60/891,355, filed Feb. 23, 2007, the disclosure of which is incorporated herein by reference.

TECHNICAL FIELD OF THE INVENTION

The present invention relates to display arrangements and, more particularly, a method for extending the lifetime of a display arrangement in a portable device and a portable device comprising such a method.

DESCRIPTION OF RELATED ART

Within the field of portable devices there is a trend to provide such devices with an ever increasing number of functions. In particular, there is a trend to provide portable devices with exterior displays for readily presenting status information to a user of such device. The status information may include information about the status of the portable device itself or information about other conditions known to the portable device. For example, an exterior display may present an icon indicating the battery status for the portable device. As another example, the display may include a clock or similar image for presenting the time. Naturally, a vast spectrum of other information can easily be presented on an exterior display.

Status information or similar information is typically presented in a substantially static manner with respect to the character and position on the display, etc. This increases the risk for degradation of the display that may eventually lead to a phenomon known as "burnouts" producing darkened, shadow or "ghost" images on the display, whereby latent images of the information remain after the information changes or is to be removed.

The problem may not be as imminent for LCDs (liquid crystal displays) that are commonly used in portable devices, since LCDs have become less susceptible to burnout effects. However, these effects are indeed relevant for other display types, e.g., for the so-called OLED (organic LED) displays.

The OLED displays are gaining momentum as exterior displays in portable devices since, for example, they exhibit low power consumption and superior resolution and crispness, and aesthetically for their ability to blend in extremely well with the shape and color of various exterior designs. However, OLED displays have a rather short lifetime compared to traditional LCD displays and the performance of an OLED display will therefore degrade comparably fast. Degradation occurs on an individual diode level, and heavily used areas—e.g., areas presenting a clock or a battery icon or some other status information,—tend to degrade in performance (less luminance, etc.), which results in annoying silhouettes and/or lingering imagery.

Degradation effects may be avoided by periodically moving the status information presented on the displayed. However, this is unsuitable in applications where the status information should have a fixed position, e.g., for the reasons of being easily detected by the user. In addition, moving the status information will typically be insufficient to avoid long-term degradation effects since the presented status information is typically insufficiently distributed to accomplish an even utilization of the display. In addition, there may be insufficient space in a small display on a portable device to accomplish the necessary movements of the presented status information.

Degradation effects may also be avoided by temporarily switching the image presenting status information to a replacement image being less degrading with respect to the display. The status image can then be switched back when the user wishes to see the status information and/or when the status information is updated. However, it is difficult to find a replacement image that has sufficiently low degrading effects, especially on a small display in a portable device. Moreover, switching back from a replacement image to the status image will typically hide the change or transition of an icon or similar that presents the status information. In other words, the icon or similar may have assumed its new shape before the switch from the replacement image to the status image has been completed. Hence, a user of the portable device will not be able to readily see the transition of the icon or similar from one state to another. Rather, the user will merely see the new state. Hence, the user will receive no support in detecting a change in status information. Instead, the user has to examine the status image and rely on memory to find out a possible change.

In view of the above it would be advantageous to provide a method of reducing or eliminating degradation effects in a display of a portable device and a portable device including such a method. For example, it would be advantageous to provide a method and device for mitigation of possible burnout effects that indicates to the user that a change in the information presented is occurring on the display.

SUMMARY OF THE INVENTION

Implementations of the present invention provide a method of reducing or eliminating degradation effects in a display of a device, and a device comprising such a method.

Thus, some implementations provide a method of preserving an operational lifetime of a display, and a device in which such method may be implemented. For example, implementations may mitigate possible burnout effects.

According to a first aspect of the present invention, a method for reducing or eliminating degradation effects in a display of a portable device, includes: presenting particles of a particle system on the display; and moving the particles in the particle system so that the display is substantially uniformly utilized.

The method may provide the advantage of a marked reduction or even an elimination of the degradation effects in a display of a portable device.

A second aspect of the invention is directed to a method including the steps of the first aspect and characterized by the steps of moving the particles in the particle system so that the display is substantially uniformly utilized by generating and emitting particles with different attributes.

A third aspect of the invention is directed to a method including the steps of the first aspect and characterized by the steps of moving the particles in the particle system so that the display is substantially uniformly utilized by varying the attributes of the presented particles.

A fourth aspect of the invention is directed to a method including the steps of the first aspect and characterized by the steps of using a particle system comprising at least a subset of particles having a shape that enables the subset of particles to form a raster object.

This is advantageous since the ability of the particles to form a raster object can be used to support the user in detecting a change in the information presented on the display.

A fifth aspect of the invention is directed to a method including the steps of the first aspect and characterized by the steps of using a particle system comprising at least a subset of particles with a substantially polygonal shape that enables the subset of particles to form a raster object.

A sixth aspect of the invention is directed to a method including the steps of the first aspect and characterized by the steps of moving the particles in the particle system at a reduced speed when the battery power of the portable device is reduced.

A seventh aspect of the invention is directed to a method including the steps of the first aspect and characterized by the steps of altering the movement pattern for the particles so as to form a displayable object when information is to be presented on the display.

An eight aspect of the invention is directed to a method including the steps of the seventh aspect and characterized by the steps of altering the movement pattern for the particles by allocating a raster pattern on the display as an attractor to which the particles is attracted so as to form the displayable object.

A ninth aspect of the invention is directed to a method including the steps of the eight aspect and characterized by the steps of using a raster pattern in the form of a bitmap.

A tenth aspect of the invention is directed to a method including the steps of the eight aspect and characterized by the steps of using a raster pattern that correspond to the displayable object.

According to an eleventh aspect of the present invention which provides a portable device that includes a display and a display control unit being arranged to reduce or eliminate degradation effects in the display, by operatively: presenting particles of a particle system on the display, and moving the particles in the particle system so that the display is substantially uniformly utilized.

A twelfth aspect of the invention is directed to a portable device including the features of the eleventh aspect and characterized in that the display control unit is arranged to operatively move the particles in the particle system so that the display is substantially uniformly utilized by generating and emitting particles with different attributes.

A twelfth aspect of the invention is directed to a portable device including the features of the eleventh aspect and characterized in that the display control unit is arranged to operatively move the particles in the particle system so that the display is substantially uniformly utilized by varying the attributes of the presented particles.

A fourteenth aspect of the invention is directed to a portable device including the features of the eleventh aspect and characterized in that the particle system comprises at least a subset of particles having a shape that enables the subset of particles to form a raster object.

A fifteenth aspect of the invention is directed to a portable device including the features of the eleventh aspect and characterized in that the particle system comprises at least a subset of particles with a substantially polygonal shape that enables the subset of particles to form a raster object.

A sixteenth aspect of the invention is directed to a portable device including the features of the eleventh aspect and characterized in that the display control unit is arranged to operatively move the particles in the particle system at a reduced speed when the battery power of the portable device is reduced.

A seventeenth aspect of the invention is directed to a portable device including the features of the eleventh aspect and characterized in that the display control unit is arranged to operatively alter the movement pattern for the particles so as to form a displayable object when information is to be presented on the display.

An eighteenth aspect of the invention is directed to a portable device including the features of the seventeenth aspect and characterized in that the display control unit is arranged to operatively alter the movement pattern for the particles by allocating a raster pattern on the display as an attractor to which the particles is attracted so as to form the displayable object.

A nineteenth aspect of the invention is directed to a portable device including the features of the eighteenth aspect and characterized in that the raster pattern is a bitmap.

A twentieth aspect of the invention is directed to a portable device including the features of the eighteenth aspect and characterized in that the raster pattern corresponds to the displayable object.

A twenty-first aspect of the invention is directed to a computer program product stored on a computer usable medium, including readable program means for causing a portable device to execute, when said program means is loaded in the portable device comprising a display and a display control unit being arranged to reduce or eliminate degradation effects in the display; including the steps of: presenting particles of a particle system on the display, and moving the particles in the particle system so that the display is substantially uniformly utilized.

A twenty-second aspect of the invention is directed to a computer program element having a program recorded thereon, where the program is to make a portable device to execute, when said program means is loaded in the portable device comprising a display and a display control unit being arranged to reduce or eliminate degradation effects in the display; the steps of: presenting particles of a particle system on the display, and moving the particles in the particle system so that the display is substantially uniformly utilized.

Further advantages of the present invention and embodiments thereof will be apparent from the following detailed description of the invention.

It should be appreciated that the terms "comprises/comprising" and/or "includes/including,: when used in this specification, are taken to specify the presence of stated features, integers, steps or components, but does not preclude the presence or addition of one or more other features, integers, steps, components or groups thereof.

It should also be appreciated that the methods defined by the appended claims may comprise further steps in addition to those mentioned and the steps may be performed in different sequences without departing from the present invention.

BRIEF DESCRIPTION OF THE DRAWINGS

The present invention will now be described in more detail in relation to the enclosed drawings, in which:

FIG. 1b is a schematic side view of the exemplary device of FIG. 1a;

FIG. 4b is a schematic illustration of another state of the exemplary particle system in FIG. 4a;

FIG. 6 is an illustration of information presentation in the form of an exemplary icon produced by an alignment of the particles of the exemplary particle system in FIG. 4a;

DETAILED DESCRIPTION

Various embodiments of the present invention relate to portable devices in general, and to portable communication devices in particular, including at least one display for presenting visible information to a user of the device.

Figure 1A:
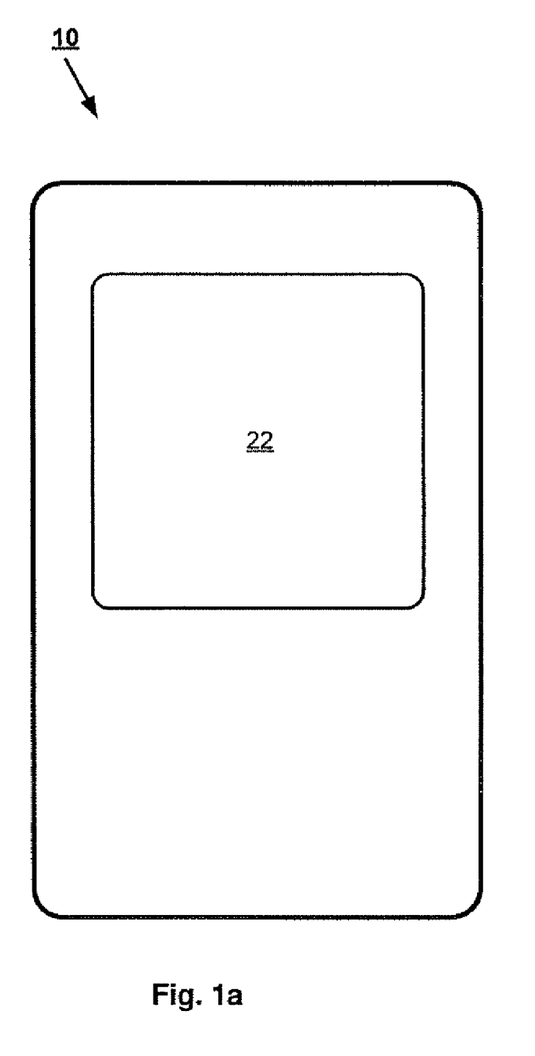
FIG. 1a is a schematic front view of an exemplary device in which systems and methods of the invention may be implemented.
Figure 1B:
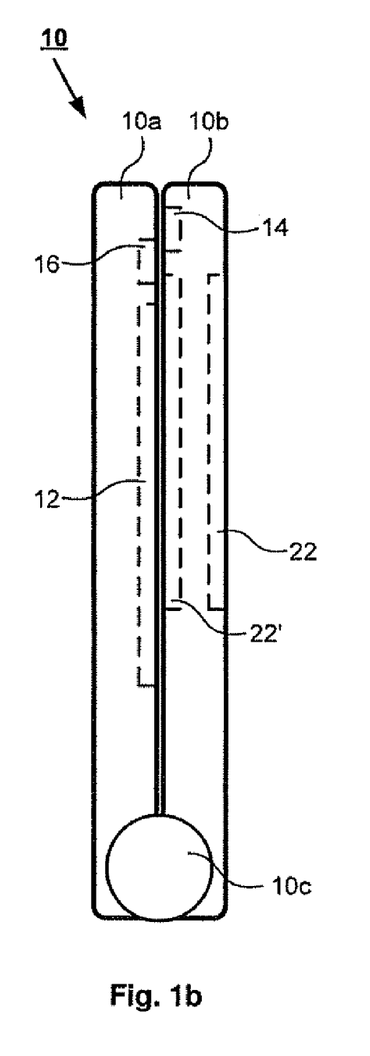

FIG. 1a is a front view and FIG. 1b is a side view of a portable communication device according to an embodiment of the invention. The communication device schematically illustrated in FIGS. 1a and 1b may include a phone 10, such as a cell phone or other mobile terminal adapted to operate according to 3G-technology (e.g., W-CDMA or CDMA2000) or 2.5-technology (e.g., GPRS) or 2G-technology (e.g., GSM) or a similar technology. Information about 3G-technology, 2.5G-technology and 2G-technology can e.g. be found in specifications from the $3^{rd}$ Generation Partnership Project (3GPP) (see, e.g., www.3gpp.org).

Phone 10 in FIGS. 1a and 1b may include a first portion 10a and a second portion 10b, for example, arranged opposite to each other. Portions 10a and 10b may connect at a joint 10c, which makes it possible to fold portions 10a and 10b for closing phone 10 and to unfold portions 10a and 10b for opening phone 10. Existing cell phones including two halves, such as clamshells or flip phones, that can be folded and unfolded, need no further description. Typical examples include the cell phone models Z310i, W710i, Z710i and Z300 that are commercially available from SonyEricsson, each including two halves that can be folded and unfolded.

The inner side of first portion 10a in FIG. 1b may include a keypad 12 and a microphone 16. These features are illustrated by dashed lines in FIG. 1b. Keypad 12 may be used for entering information such as selection of functions and responding to prompts. Microphone 16 may be used for sensing audible input from the user.

The inner side of second half 10b shown in FIG. 1b may be include a loudspeaker 14 and an interior display 22'. These features are illustrated by dashed lines in FIG. 1b. Loudspeaker 14 may be used for presenting sounds to the user and interior display 22' may be used for displaying images, video sequences, functions, and prompts, etc, to a user of phone 10.

As can be seen in FIGS. 1a and 1b, phone 10 may be provided with an exterior display 22. In one implementation, exterior display 22 may include an OLED-display or similar type of display for presenting status information, which is typically presented in a substantially unchangeably manner with respect to the character and position on exterior display 22.

In addition, phone 10 may include an antenna, which may be used for communication with other users via a network as will be explained below. The antenna may be in-built in phone 10 and hence not shown in FIG. 1.

It should be appreciated that phone 10 in FIGS. 1a and 1b is merely an example of a portable communication device in which the invention can be implemented. In addition, the invention may, for instance, be used in connection with a music player, a radio, a PDA (personal digital assistant), a palm top computer, a lap top computer, a smartphone, or any other suitable portable device that includes a display.

Figure 2:
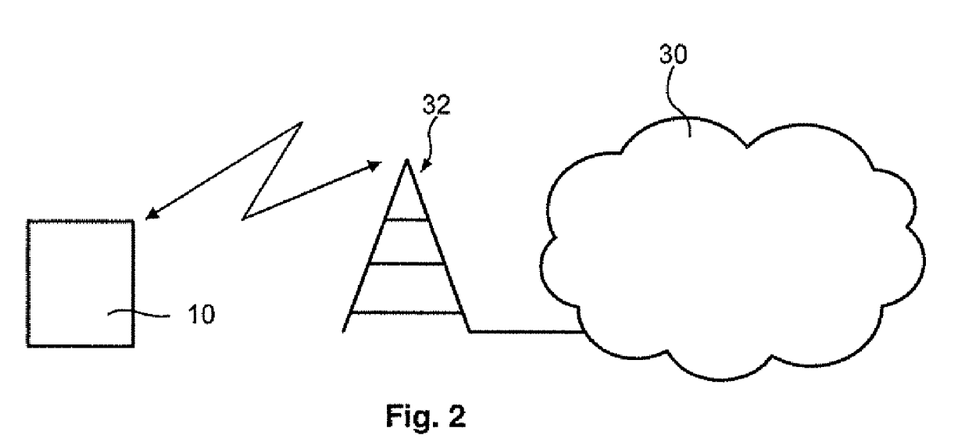
FIG. 2 shows an exemplary network in which systems and methods of the invention may be implemented.

FIG. 2 shows phone 10 connected to a cellular network 30 via a base station 32. Network 30 may include a 3G network, such as a WCDMA network or similar network. However, network 30 may also be a GPRS network or any other 2G, 2.5G, or 2.75G network. Moreover, network 30 need not be a cellular network, but may instead include some other type of network, such as the Internet, a corporate intranet, a LAN, a wireless LAN, a PSTN, or another type of network.

Figure 3:
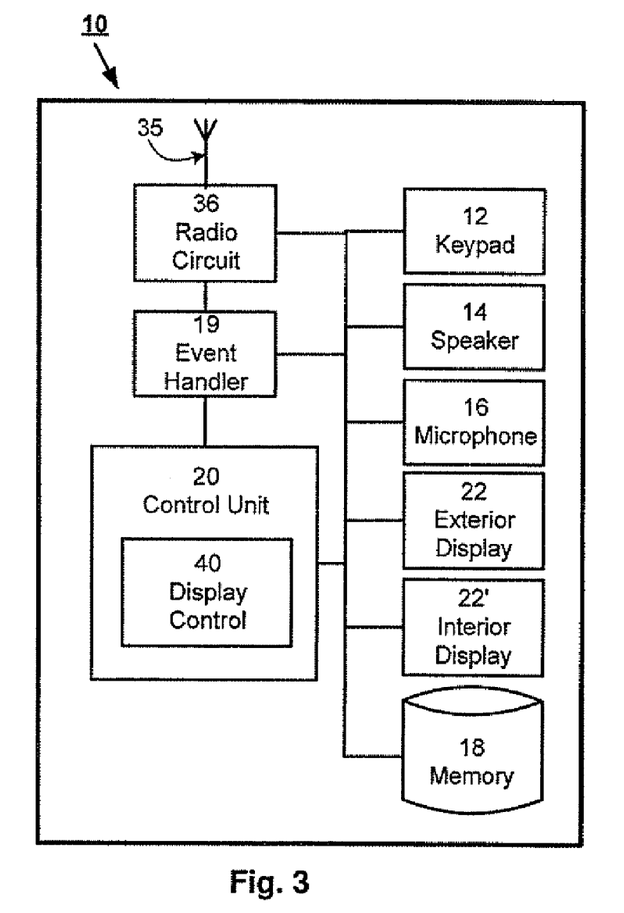
FIG. 3 is a schematic illustration of functional components of the exemplary device of FIG. 1.

FIG. 3 shows functional components of the interior of phone 10 being relevant for discussion of the present invention. Phone 10 may include an antenna 35 connected to a radio circuit 36 for enabling radio communication with network 30 as described above with reference to FIG. 2. Radio circuit 36 may connect to an event handling unit 19 configured to handle such events as outgoing and incoming communication to and/or from external units via, for example, network 30, e.g., calls and messages, e.g., SMS (short message service) and MMS (multimedia messaging service), etc. Such parts may exist in cell phones and, as such, require no further discussion herein.

Furthermore, a control unit 20 may be arranged within phone 10 and configured to control and/or supervise the general operation of phone 10. Control unit 20 may be implemented by means of hardware and/or software, and control unit 20 may include one or several hardware units and/or software modules, e.g., one or several processor units provided with or having access to the appropriate software and/or hardware associated with the functions of phone 10, as is well known by those skilled in the art.

As can be seen in FIG. 3, in some implementations of the present invention, control unit 20 may connect to keypad 12, speaker 14, microphone 16, event handling unit 19, exterior display 22, and/or interior display 22'. This configuration enables control unit 20 to control and/or communicate with these units or other functional components, for example, for exchange of information and/or instructions.

Before proceeding, it will be appreciated that aside from the parts and units shown in FIG. 3, additional parts and units or similar components may be present in phone 10. The parts and units shown in FIG. 3 may also connect to more parts and units than that which is illustrated.

In some implementations of the present invention, control unit 20 includes display-control 40. Being associated with control unit 20 implies that display-control 40 may be implemented by means of hardware and/or software and/or display-control 40 may include one or several hardware units and/or software modules, e.g., one or more processor units provided with or having access to the software and/or hardware appropriate for the functions associated with phone 10.

Display-control 40 may be configured to operatively process the information presented on displays 22 and 22'. In particular, display-control 40 may be arranged to operatively process the status information presented via exterior display 22. Cell phones provided with various display controls for controlling the information presented on an internal and/or an external display exist. Such display controls or similar devices may be found, for example, in the above-mentioned cell phone models Z310i, W710i, Z710i and Z300 that are commercially available from SonyEricsson.

However, as a contrast to traditional display controls used in portable devices, display-control 40 may utilize a type of a particle system to form information on exterior display 22 and, possible, also on internal display 22r.

A wide range of particle systems are known to those skilled in the art. For example, particle systems used for modeling objects in movies and similar media have been described by Reeves as early as in 1983 (see "Particle Systems—A Technique for Modeling a Class of Fuzzy Objects," ACM Computer Graphics, Vol. 2 No. 2, April 1983, pp. 91-108). Another example can be found in U.S. Pat. No. 5,777,619 (Brinsmead), which describes a method for simulating and rendering hair by means of a particle system. Still another example can be found in the article "Real-Time Cloud Rendering," EUROGRAPHICS European Association for Computer Graphics, Vol. 20 (2001) No. 3. Many other sources describing different aspects of particle systems are readily available to those skilled in the art.

A particle system is essentially a set of rules that are used to define how to "generate" and "render" particles for display images on a display, such as a computer display screen or monitor.

Generating particles in a particle system includes defining particle attributes for each particle to be modeled.

For example, particle attributes may include one or more of the following:
(1) position,
(2) velocity (i.e., both speed and direction),
(3) size,
(4) color (i.e., both color and gray scale),
(5) transparency,
(6) shape, and
(7) lifetime.

The particles in a particle system generated by display-control 40 may be assigned more, fewer and/or other attributes than those in the above exemplifying list. In addition, the attributes may be varied and/or altered during particle generation. In addition, or, as an alternative, at least some attributes of an individual particle may be varied and/or altered during the lifetime of the particle, e.g., velocity (speed and direction), size, color (color and gray scale), transparency, shape, and/or lifetime. It may be said that a particle is no more than a record containing some attributes.

In some implementations, display-control 40 may generate particles into a particle system by means of controlled stochastic processes. One process may determine, e.g., the number of particles entering the system during each interval of time, that is, at a given frame or at a given rendering. In some implementations, the number of new particles depends on the screen size of exterior display 22.

Upon particle generation, display-control 40 may be configured to render the particles by converting one or more of the attributes of each particle into information that may be used by exterior display 22 or similar device to output the rendered particle information by controlling individual pixels on exterior display 22. In other words, an image may be created, in which the position and/or other properties of each particle may be defined. The image may then be presented via exterior display 22.

In some implementations, a rendering may be performed periodically. For example, a rendering may be performed periodically during the lifetime of the particle system, even after the particle generation has ceased. In this regard, a series of images may be produced and presented via exterior display 22, in which series the position and possibly other properties of the particles in the particle system may be different for one or more of the presented images. The observant reader will appreciate doing so may create an impression of motion with respect to the particles, at least if the images are created and presented at sufficiently short intervals. The principle somewhat resembles a movie that is shot by means of 35 millimeter film or the like, which is subsequently presented in a well-known manner on a movie screen running at 24 frames (images) per second or more.

Individual particles may be rendered and displayed as dots, lines, polygons, or more complex objects. In some embodiments of the present invention, the particles may assume a substantially square like shape or other regular shape, such as rectangles or triangles, or any other substantially polygonal shape being adapted to form a part of a raster pattern such as a raster image, e.g., in the form of a bitmap grid or similar graphic format. As configured, the particles may be suitable for forming a part of an image presented in a bitmap format or some other raster graphic format, as will be described in detail below. However, particles having other shapes, such as substantially circular, elliptical, or other curve like shapes are possible. It should be appreciated that a single particle system may include particles of different shapes and dimensions.

Figure 4A:
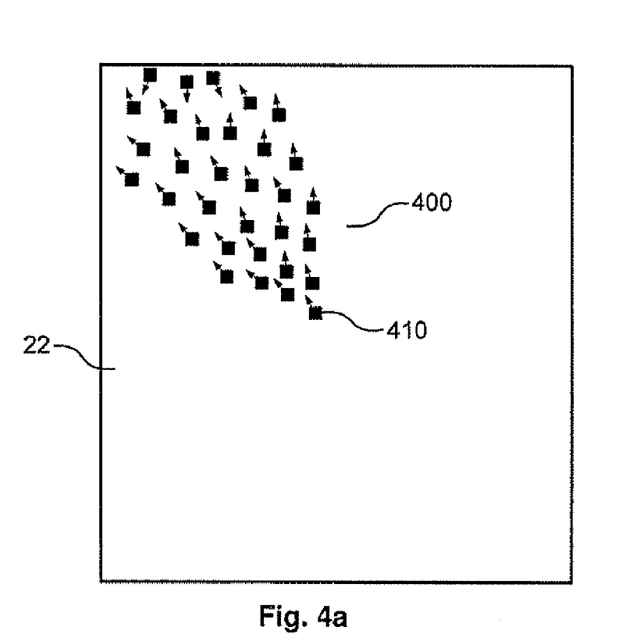
FIG. 4a is a schematic illustration of an exemplary state of particle generation in a particle system presented via a display.

FIG. 4a shows a schematic illustration of an exemplifying particle generation that is presented on exterior display 22 of phone 10. Exemplifying particles 410 may appear as substantially square-like shapes and each particle has been provided with an imaginary arrow. The direction of the imaginary arrow is intended to indicate a travelling direction for the particle at a given point in time. The length of the imaginary arrow is intended to indicate the travelling speed for the particle. The arrows of particles 410 in particle system 400 are of substantially the same length, thereby indicating that each of particles 410 are travelling at substantially the same speed. However, the travelling speed may be individually determined or selected for each particle or for each subset of particles. Naturally, particles 410 may be of any suitable intensity or color—including, but not limited to black, white and grey scales—depending on the ability of exterior display 22 and display-control 40. It should be appreciated that one of particles 410 may correspond to a single pixel (e.g. black or white particles) in exterior display 22, or a group of pixels (e.g., an RGB group for a colored particle) in exterior display 22.

In one implementation, the travelling speed for particles 410 may be reduced as the battery power of phone 10 decreases. This configuration reduces the required processing power which in turn reduces the consumption of battery power. In addition, this configuration provides the user with an excellent indication that the battery should be charged.

As indicated in FIG. 4a, particles 410 may be emitted from a point or an area at or near the center of exterior display 22. As also indicated in FIG. 4a, particles 410 may be emitted in a direction generally toward the upper left corner of exterior display 22. However, this is only an exemplary configuration and particles 410 may be emitted from substantially any position on exterior display 22. Similarly, particles 410 may be emitted from substantially any "object"—at least any object that can be presented via exterior display 22. In addition, particles 410 may be emitted from multiple positions, such as the perimeters of an object that is visibly or invisibly allocated via exterior display 22. The object in question may be, for example, an icon, a letter or a digit, or some other image that may be presented via exterior display 22, or even a group of such objects.

Particles 410 may be emitted in multiple directions. Particles 410 may even be emitted in substantially every direction, e.g., randomly emitted in any direction of 0-360° from an object allocated on exterior display 22. In addition, as illustrated in FIG. 4a by three of particles 410 in the upper left corner of exterior display 22 having arrows pointing in a downward direction, particles 410 may "bounce" or deflect at an outer perimeter or other designated boundary of exterior display 22, for example, with a corresponding change in velocity (e.g., associated with an angle of incidence). In other implementations, particles 410 may traverse the perimeter or other designated boundary and "disappear." In some implementations, those of particles 410 that have disappeared may re-appear at a predetermined portion of the perimeter, for example, at a point of entry opposing the point of departure corresponding to a continued path of travel, immediately, or alternatively, after a predetermined elapsed time. In some implementations, those of particles 410 colliding with each other may alter the velocity of one or more of those of particles 410 involved in the "collision." In other implementations, particles 410 may at least partially occupy the same space in time without alteration of the velocity and/or other attributes of any of particles 410 involved.

Figure 4B:
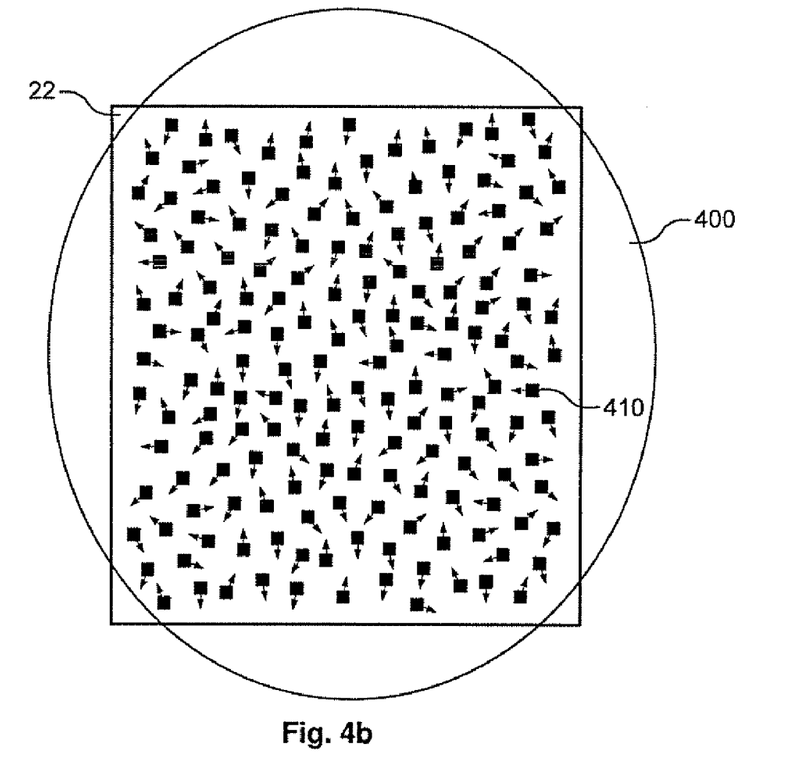

FIG. 4b shows another schematic illustration of particle system 400 generated on via exterior display 22. The particle generation may still be active or it may have ended. In either case, exterior display 22 in FIG. 4b may be substantially covered with particles 410 that move in substantially any direction so as to give a substantially uniform utilization of exterior display 22. This may be accomplished, for example, by more or less randomly generating and emitting particles 410 with different attributes in substantially any direction as described above. In addition, or as an alternative, this may be accomplished by varying the attributes of the already-generated particles 410, e.g., by varying the velocity (speed and/or direction) of the individual particles in a substantially random manner.

Naturally, there are many more or less sophisticated ways of moving particles 410 on exterior display 22 so that exterior display 22 is substantially uniformly utilized. In addition to the examples given above, it should be mentioned that particles 410 may be moved, for example, so as to emulate a cloud-like shape or some other irregular shape that gives a substantially uniform utilization of exterior display 22.

To summarize, as described above, it should be clear that it is possible to provide an excellent reduction or even an avoidance of any burnout effects by allocating particle system 400 via exterior display 22 and move particles 410 in particle system 400 so that exterior display 22 is substantially uniformly utilized. This may even be done on a pixel level, since a particle may correspond to a pixel on exterior display 22.

However, moving particles 410 so that exterior display 22 is substantially uniformly utilized is less suitable during the short periods when exterior display 22 is actually presenting status or other type of information to a user of phone 10. Thus, when exterior display 22 is presenting status information to a user, for example, the movement of particles 410 in particle system 400 may be at least temporarily changed so as to form a representation of the status information to be presented.

Figure 5:
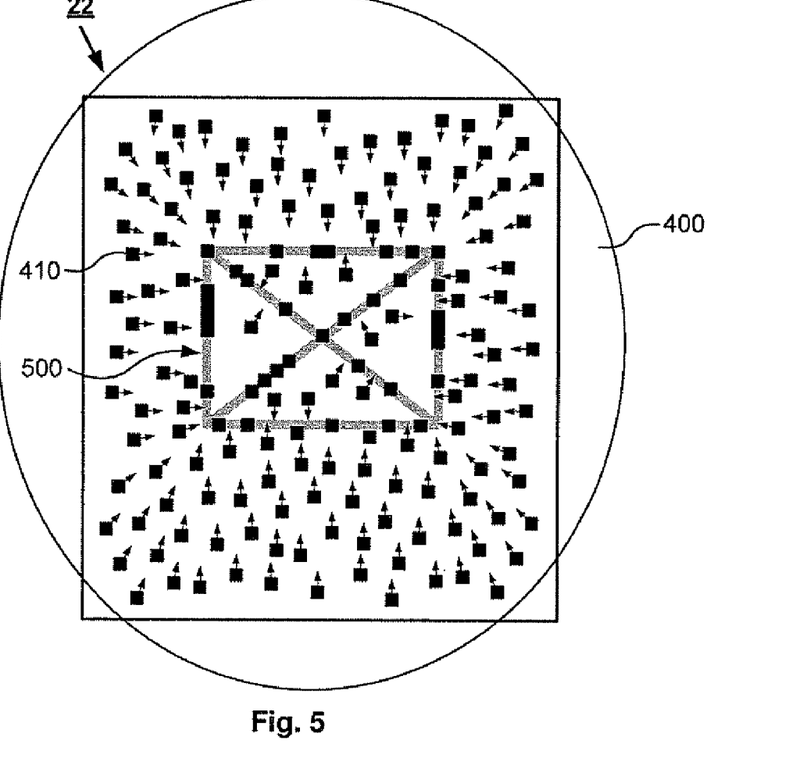
FIG. 5 is a schematic illustration of the exemplary display and particles formation in the exemplary particle system in FIG. 4a when information is to be presented on the display.

FIG. 5 shows a schematic and exemplifying illustration of exterior display 22, particle system 400, and particles 410 in a configuration in which status information is about to be presented on exterior display 22.

As an example, assume that a message has been received by phone 10. Hence, the status information presented on exterior display 22 should be represented by an object or similar graphic designed so that a user of phone 10 may readily recognize that a message has been received. For example, a bitmap 500 or similar graphic forming an object in the form of a schematic envelope has been allocated on display 22. Bitmap 500 in FIG. 5 is presented via exterior display 22, for example, using a grey shade. Bitmap 500 may be more or less visibly or even invisibly arranged on display 22.

Before proceeding, a brief explanation should be given of the expression "bitmap." A bitmap or similar raster graphics is essentially a data file or structure typically representing a generally square, rectangular, or other polygonal grid of pixels or points or similar unit on a computer monitor or on some other display device. The color, etc., of each pixel is individually defined; images in the RGB color space, for instance, often consist of colored pixels defined by three bytes—one byte each for red, green, and blue. Less colorful images require less information per pixel; for example, an image with only black and white pixels requires only a single bit for each pixel. Raster graphics are distinguished from vector graphics in that vector graphics represent an image through the use of geometric objects such as curves and polygons.

Once bitmap 500 has been allocated on exterior display 22, bitmap 500 may be utilized by display-control 40, for example, as an attractor to which particles 410 in particle system 400 are drawn, so as to form a representation of the status information to be presented. This has been illustrated in FIG. 5a by directing the imaginary arrows on particles 410 towards points on the schematic envelope formed by bitmap 500. This indicates that the attributes of particles 410 have been updated and at least some of them altered so that particles 410 generally move toward bitmap 500. For example, individual ones of particles 410 are drawn to the point in bitmap 500 that is the nearest to the individual ones of particles 410, at a point in time. However, one or several other points in bitmap 500 are clearly conceivable as a point-of-attraction or concentration of particles 410, e.g., a corner point or a center point. The point to which a specific one of particles 410 is drawn may even be selected in a random manner from the points in bitmap 500 or similar raster image.

Using bitmap 500 or a similar raster image as an attractor for particles 410 makes it easy to compute the direction and distance, etc., from a particle to a point in bitmap 500 or similar graphic. In particular, it is much easier to compute the direction and distance from a particle to a point in a bitmap, such as bitmap 500, than computing the direction and distance from a particle to a vector shape, which may be used as attractors in particle systems.

The attraction forces from bitmap 500 acting particles 410 shown in FIG. 5 may be substantially the same for each of particles 410. However, other configurations are clearly conceivable. In one implementation, attraction forces may decline with the distance from bitmap 500, e.g., inversely proportional to the distance (1/distance). For example, those of particles 410 furthest from bitmap 500 may approach bitmap 500 at a lower speed compared to those of particles 410 proximate bitmap 500. Another alternative may be to increase the attraction forces with the distance from bitmap 500. For example, those of particles 410 furthest from bitmap 500 may approach bit map 500 at a higher rate of speed compared to those of particles 410 near to bitmap 500.

When ones of particles 410 are drawn to and finally arrives at a point in bitmap 500, the movement of those of particles 410 may cease, to be positioned stationary at a point in bitmap 500. Where individual ones of particles 410 end up positioned at the same point, it may suffice to let one or more of them to remain active. The positioning of stationary ones of particles 410 in bitmap 500 grid has been illustrated in FIG. 5 by particles 410 arranged on bitmap 500 without being provided with the imaginary arrow. That is, those of particles 410 shown without an imaginary arrow have come to rest and "reside" on an emerging outline to form a visible representation of bitmap 500.

Figure 6:
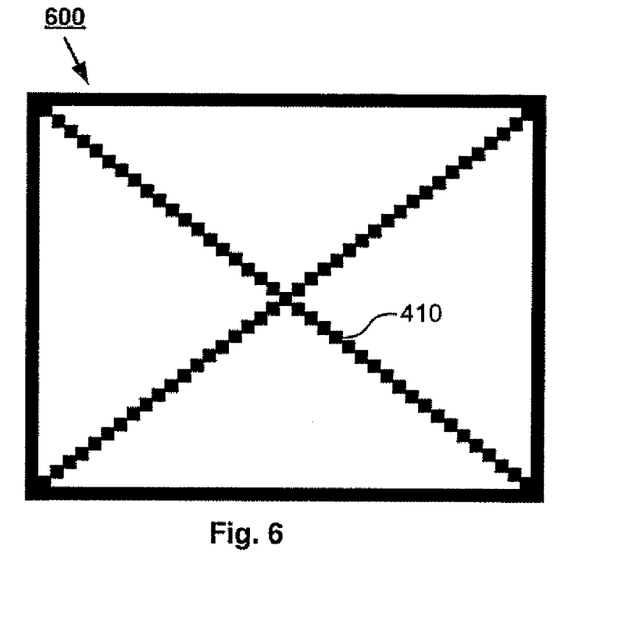

A complete presentation of status information by an object 600 including attracted and positioned ones of particles 410 so as to form a schematic envelope, is illustrated in FIG. 6. When object 600 (e.g., an envelope icon) representing the status information has been formed on exterior display 22 using particles 410, no need exists for any attractor in the form of a bitmap 500 or similar graphic. Hence, bitmap 500 may be deactivated and removed. However, alternatively, particles 410 may be deactivated and bitmap 500 may be faded in to a visible shape. This is particularly so when bitmap 500 has the same or substantially the same shape as object 600 (e.g. an envelope icon) representing the status information to be presented via exterior display 22.

To summarize, in view of the above it should be clear that particle system 400 including particles 410 may be controlled by an attractor in the form of a bitmap 500 or a similar raster graphic format. In particular, bitmap 500 or similar graphic may provide a visible, semi-visible, or invisible image representation of the status information to be presented via exterior display 22 and to which at least some of particles 410 are drawn. This creates a stream of particles 410 that can be easily detected and followed by the user. In other words, the stream of particles 410 provides the user with an indication of a change in status information. Hence, the transaction from the state when the particles 410 are moving so that exterior display 22 is substantially uniformly utilized to a state when particles 410 form object 600 for presenting status information on exterior display 22, readily apparent to a user of phone 10.

Below, exemplary steps are described of a method for at least eliminating degradation effects in exterior display 22 by using a particle system 400 in which the transaction from the state when particles 410 are moving in an less degrading manner to a state when particles 410 form object 600 for presenting status information via exterior display 22 is readily perceptible to a user of phone 10.

A first step S1 in an exemplifying embodiment of the present invention includes, an initialization of a method for reducing or eliminating degradation effects in exterior display 22. The initialization may include such actions as, defining particle attributes for particles 410 in particle system 400 to be allocated in exterior display 22 of phone 10, and an initialization of controlled stochastic processes for generating particles 410 into particle system 400, etc.

In a second step S2, particles 410 in particle system 400 may be generated. For example, generated particles 410 may be rendered and displayed on exterior display 22. However, particles 410 may not be rendered and displayed on display 22 until a third step S3.

In a third step S3, particles 410 in particle system 400 may be displaced from a point of generation and/or thereafter so that exterior display 22 is substantially uniformly utilized. As mentioned above, a rendering may be performed periodically so as to produce a series of images being presented via exterior display 22, in which series the position and possibly other properties of particles 410 in particle system 400 differ from presented image to presented image. In this regard, virtual motion may be created with respect to particles 410, at least where the images are created and presented at sufficiently short intervals. A substantially uniform utilization of display 22 may be accomplished, for example, by more or less randomly generating and emitting particles 410 with varying attributes in substantially any direction. In addition or, alternatively, a substantially uniform utilization of display 22 may be accomplished by varying the attributes of particles 410 that have been previously generated (i.e., existing particles 410), for example, by varying the velocity (speed and/or direction) of individual ones of particles 410 in a substantially random manner.

Figure 7:
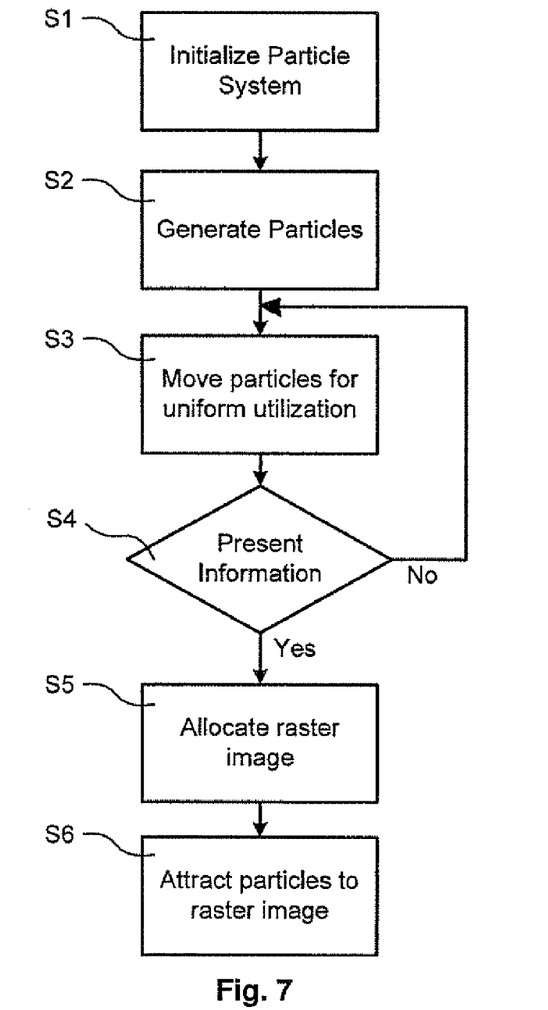
FIG. 7 is a flowchart illustrating the exemplary steps in a method according to an embodiment of the present invention.

In a fourth step S4, it is investigated whether display 22 is supposed to present information, such as status information to a user of phone 10. Exterior display 22 may be supposed to present information when previous information is changing and/or when the user provides a command, e.g., pushes a button on keypad 12 or using another input mechanism. If it is determined that no information is currently to be presented via exterior display 22, display-control 40 may continue to cause movement among particles 410 in particle system 400 so that exterior display 22 is substantially uniformly utilized. This is indicated in FIG. 7 by an arrow from present step S4 to previous step S3. When, on the other hand, information is to be presented on exterior display 22, display-control 40 may continues the execution in step S5.

In a fifth step S5, a bitmap 500 or a similar raster image is allocated on exterior display 22. For example, bitmap 500 or similar graphic may represent an object 600 or similar image designed to inform a user of phone 10 of the subject status information. Object 600 may, for example, include an icon or similar symbol. In another embodiment, the plain status information as an object 600, e.g. a letter or a digit, that is a substantially direct representation of the status information may be used. An example may be a presentation of status information in the form of a temperature, where the object may have the form of "+/−NN° C.", e.g. "+10° C."

In a sixth step S6, particles 410 of particle system 400 may be attracted to bitmap 500 that has been allocated via display 22 in step S5. Particles 410 may be attracted to bitmap 500 so as to align to form object 600 that represents the status information to be presented. In other words, for example, particles 410 may be attracted to bitmap 500 and positioned therein so as to form object 600 being a representation of bitmap 500, as previously described above with reference to FIGS. 5 and 6.

In view of the above description of various embodiments it should be appreciated that the present invention provides an improvement for extending or preserving the usable lifetime of a display arrangement (e.g., screen, such as a touchscreen)) in portable devices. In particular, it should be appreciated that possible degradation effects are reduced or eliminated in a manner that enables the user to detect a change in the information to be or being presented via a display, such as exterior display 22.

Figure 8:
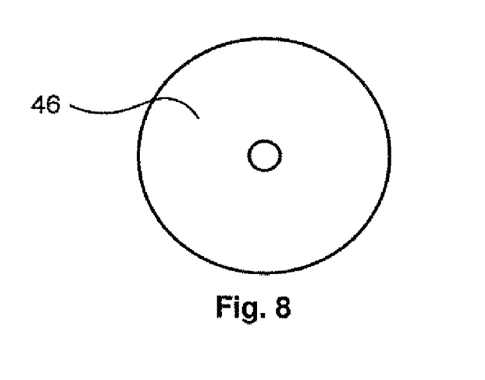
FIG. 8 is a CD ROM on which program code for executing a method according to the invention may be provided.

In general, as previously explained, display-control 40, configured to perform the exemplifying method described above, may be provided in the form of one or more processors with corresponding memory containing the appropriate software in the form of a program code. However, the program code may be provided on a data carrier such as a CD ROM disc 46, as depicted in FIG. 8, or an insertable memory stick, which may perform the invention when loaded into a computer or into a phone having suitable processing capabilities. The program code may be downloaded remotely from a server either outside or inside the cellular network or be downloaded via a computer like a PC to which the phone is temporarily connected.

The present invention has now been described with reference to exemplifying embodiments. However, the invention is not limited to the embodiments described herein. On the contrary, the full extent of the invention is only determined by the scope of the appended claims.

What is claimed is:

1. A method of reducing and/or eliminating degradation effects in a display of a portable device, the method comprising:
   presenting particles of a particle system via the display;
   displacing the particles in the particle system so that the display is substantially uniformly utilized; and generating, when status information associated with the portable device is to be presented via the display, a displacement pattern corresponding to a displayable object representing the status information, where providing the displacement pattern includes allocating a raster pattern to which individual ones of the particles are attracted by a relative degree of attraction corresponding to a respective distance from the raster pattern.

2. The method of claim 1, where the displacing the particles comprises generating and emitting the particles, two or more of the emitted particles having at least one attribute that differs from other of the two or more emitted particles.

3. The method of claim 1, where displacing the particles comprises varying at least one attribute of one or more of the particles.

4. The method of claim 1, where the particle system comprises at least a subset of the particles, the method further comprising forming a raster object using the subset of the particles.

5. The method of claim 1, where the particle system comprises at least a subset of particles with a substantially polygonal shape that enables the subset of particles to form a raster object.

6. The method of claim 1, where the displacing the particles comprises moving the particles at a reduced speed based on battery power of the device.

7. The method of claim 1, where the raster pattern comprises a bitmap.

8. The method of claim 1, where the raster pattern corresponds to the displayable object.

9. The method of claim 1, where the relative degree of attraction is proportional to the respective distance.

10. The method of claim 1, where the relative degree of attraction is inversely proportional to the respective distance.

11. A device comprising:
a display; and
a display control unit to:
control a presentation of particles of a particle system via the display, including displacing the particles in the particle system so that the display is substantially uniformly utilized, and
generate, when status information associated with the device is to be rendered via the display, a movement pattern of the particles corresponding to a displayable object, including allocating a raster pattern to which individual ones of the particles are drawn by a relative velocity corresponding to a respective distance from the raster pattern.

12. The device of claim 11, where the display control unit is configured to generate and emit particles, at least some of the emitted particles having attributes that differ from one another.

13. The device of claim 11, where the display control unit is configured to operatively move the particles in the particle system by varying the attributes of the presented particles.

14. The device in claim 11, where the particle system comprises at least a subset of particles having a shape that enables the subset of particles to form a raster object.

15. The device in claim 11, where the particle system comprises at least a subset of particles with a substantially polygonal shape that enables the subset of particles to form a raster object.

16. The device in claim 11, where the display control unit is to operatively move the particles in the particle system at a reduced speed based on battery power of the device.

17. The device in claim 11, where the raster pattern is a bitmap.

18. The device in claim 11, where the raster pattern corresponds to the displayable object.

19. The device in claim 11, where the relative velocity is proportional to the respective distance.

20. The device in claim 11, where the relative velocity is inversely proportional to the respective distance.

21. A computer program product stored on a computer usable medium, including readable program means for causing a device to execute instructions, when said program means is loaded in the device including a display and a display control unit, the instructions to:
present particles of a particle system via the display;
move the particles in the particle system so that the display is substantially uniformly utilized;
provide an attractor having a particular shape corresponding to status information associated with the device; and
draw at least some of the particles to the attractor to render the status information, where a magnitude of a force of attraction between the attractor and a particular one of the at least some of the particles is a function of a distance of the at least some of the particles from the attractor.

22. A computer program element having a program recorded thereon, where the program is to make a portable device to execute a method, when said program means is loaded in the portable device comprising a display and a display control unit being, the method comprising:
presenting particles of a particle system via the display;
displacing the particles in the particle system so that the display is substantially uniformly utilized;
providing an attractor having a particular shape corresponding to status information associated with the device; and
drawing at least some of the particles to the attractor to render the status information, where a magnitude of a force of attraction between the attractor and a particular one of the at least some of the particles is independent of a distance of the at least some of the particles from the attractor.

* * * * *